Sept. 22, 1959    F. DE ARESPACOCHAGA    2,905,850
HEADLIGHTS
Filed Dec. 16, 1957      2 Sheets-Sheet 1
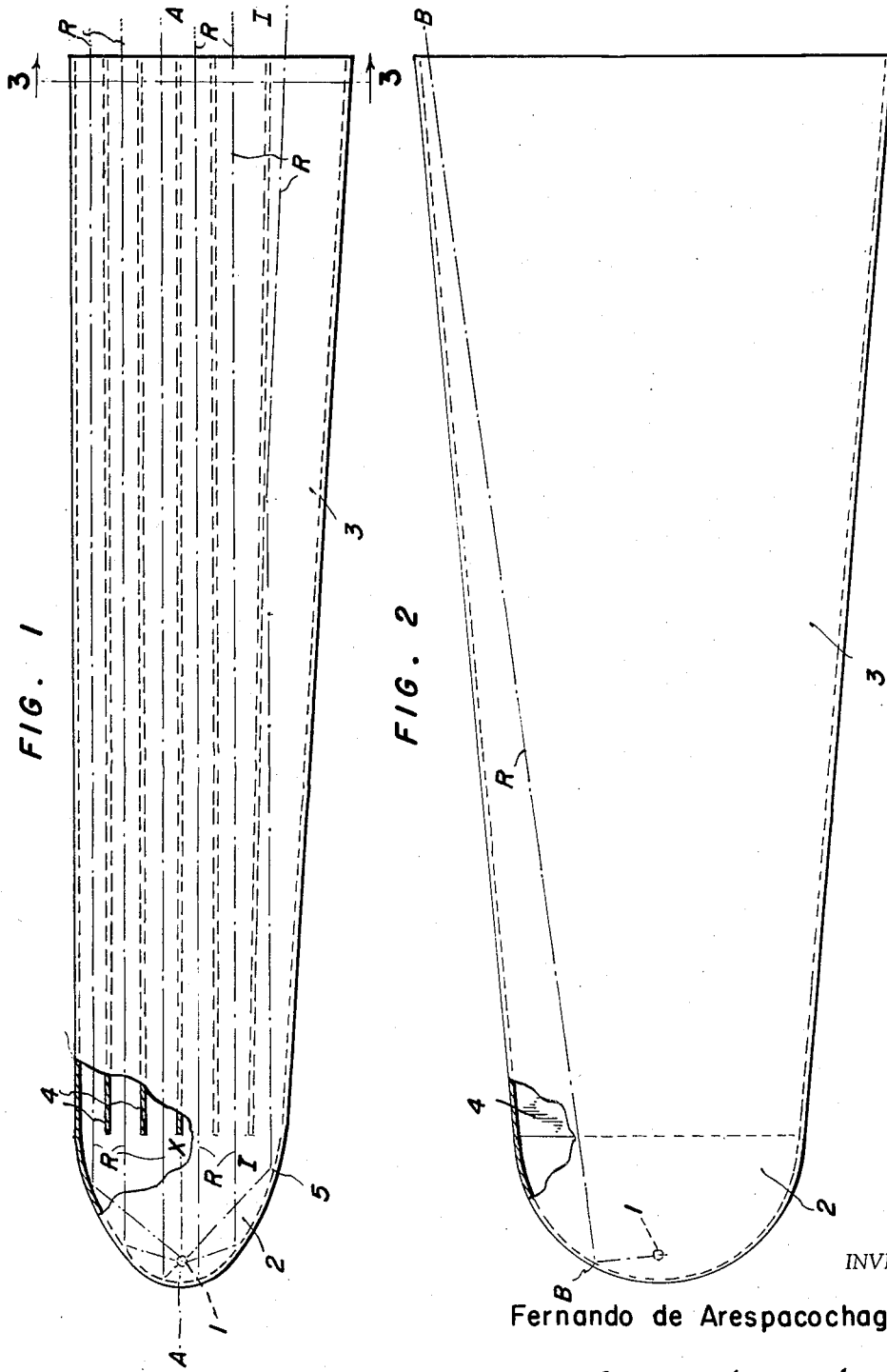
INVENTOR
Fernando de Arespacochaga,
BY Ogle P. Singleton
ATTORNEY Sept. 22, 1959 F. DE ARESPACOCHAGA 2,905,850
HEADLIGHTS
Filed Dec. 16, 1957 2 Sheets-Sheet 2
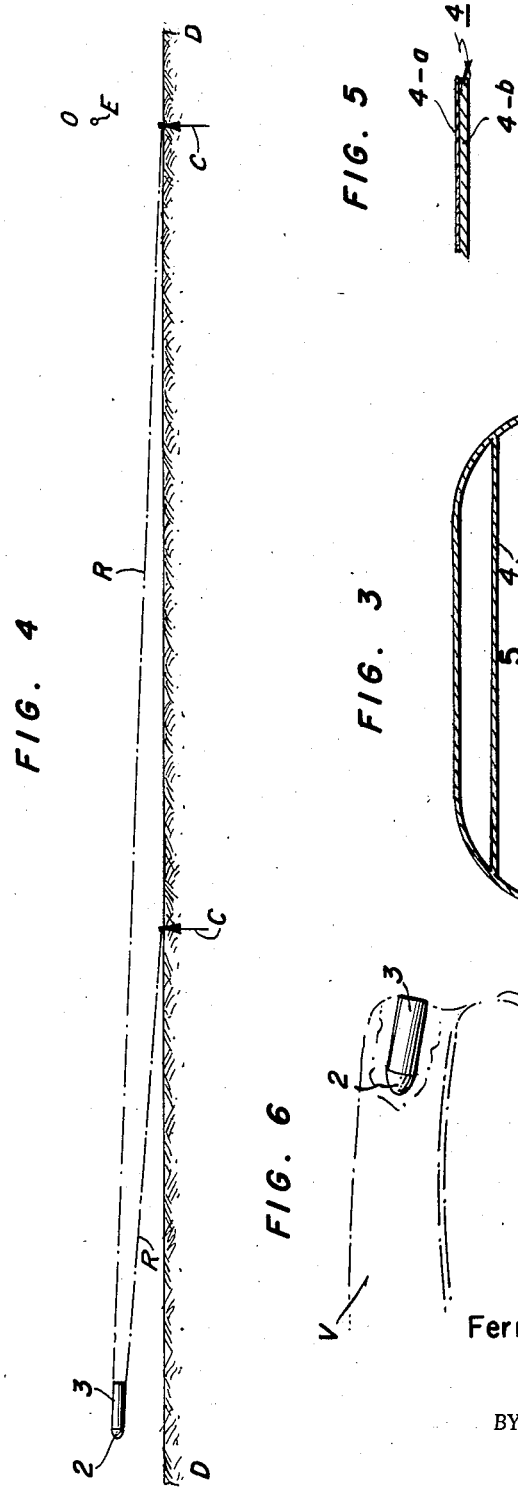
INVENTOR
Fernando de Arespacochaga,
BY Ogle R. Singleton
ATTORNEY

United States Patent Office 2,905,850
Patented Sept. 22, 1959

2,905,850

HEADLIGHTS

Fernando de Arespacochaga, Lima, Peru

Application December 16, 1957, Serial No. 702,933

4 Claims. (Cl. 313—113)

My invention consists in a new and useful improvement in headlights for vehicles and is designed to provide a headlight which produces desired illumination of the road without causing any glare to dazzle the eyes of an observer. My invention is based on the principles of hiding from the eyes of the observer the luminous source which produces the illumination, since it is a physiological fact that the human eye, with normal faculties of observation, is not dazzled by the light itself but by direct exposure of the retina of the eye to the luminous source. It is well known that, if an eye is in darkness and is exposed to a luminous source even of very little intensity, the light rays from such source reaching the retina of the eye produce irritability and cause dazzling which prevents the observer from seeing an object in front of or behind the luminous source. However, if the luminous source is hidden from the eye, without reducing the light rays projected toward the area to be illuminated, viz. the area in front of the vehicle, the area is illuminated without affecting the retina of the observer's eye, and thus no dazzling occurs.

To prevent accidents caused by dazzle, my improved headlight is mounted on the vehicle so as to hide the luminous source from the eyes of the observer.

This advantageous result of not being dazzled benefits not only drivers of approaching vehicles but also any observer walking or standing in darkness near highways and roads, and it is even more desirable for persons having their faculties of observation reduced through use of intoxicants. There is no question that such observers who are not dazzled are particularly favoured due to the fact that their faculties being reduced produce tiredness of the retina, weaken the normal reflexes and the nervous system, causing a tendency to fall asleep.

It is obvious that the human eye which is not dazzled is better able to determine with more precision the proximity and speed of a vehicle moving in the same or contrary direction as the observer.

Further, with my improved headlight it is not necessary to have the foot-switch installed in vehicles to dip the lights, since vehicles travelling in opposite directions enter automatically the non-glare zone of their lights. This zone is sufficiently wide so that both vehicles may pass one another, with normal speed and without loss of visibility whatsoever. The light rays from my headlight allow the driver to see the outline of the other vehicle and the zone behind it. The diffusion of the light rays and their reflection from the surface of the road where they directly strike allow the driver to clearly see trees, bridges, gates, wire, traffic signs, etc.

This desired novel result is produced, in my improved headlight, by the use of a tube placed in front of the luminous source, and having therein a series of longitudinal blades with a non-reflecting coating on their upper surfaces, their lower surfaces being light-reflecting. The particularly valuable advantage is that it is possible to determine the angle of inclination of the headlight relative the vehicle on which it is mounted, with reference to the position of the observer.

While I illustrate in the drawings and hereinafter fully describe one specific embodiment of my invention, it is to be distinctly understood that I do not consider my invention to be limited to said embodiment but refer for its scope to the claims appended hereto.

In the drawings:

Fig. 1 is a side elevation of my improved headlight, a portion being broken away.

Fig. 2 is a top plan of the light, a portion being broken away.

Fig. 3 is a vertical section on the line 3—3 of Fig. 1, in the direction of the arrows.

Fig. 4 is a diagrammatic view illustrating the path of the light rays projected by the headlight.

Fig. 5 is a vertical section on the line 5—5 of Fig. 3.

Fig. 6 is a fragmentary side elevation of a vehicle on which the headlight is mounted, a portion being broken away.

As shown in the drawings, my improved headlight comprises a lamp 1 in a concave reflector shell 2, and a tube 3 mounted in front of the shell 2, the whole being mounted on a vehicle V (Fig. 6). The lamp 1 produces light rays R which are reflected from the shell 2, in accordance with the angles of incidence and reflection. The shell 2 is of parabolic shape with its optical axis, indicated by the line A—A, aligned with the longitudinal axis of tube 3. By reason of this alignment, each reflected ray R passing through the tube 3 has a course parallel with said optical axis A—A and thus no luminous intensity is lost. The shell 2 is of hemispherical shape as viewed from above (Fig. 2). The lamp 1, being placed on said optical axis A—A between the rear end of the shell 2 and the focal point X of the shell 2, causes each light ray R to diverge, as indicated by the line B—B (Fig. 2), illuminating the sides of the road.

The tube 3 has mounted therein a plurality of blades 4 disposed longitudinally of the tube 3. Those of the blades 4 which are above the optical axis A—A (Fig. 1), and a few of the blades 4 which are below this axis are disposed parallel. This is not necessary for the blades 4 which are located further down and these blades 4 are so disposed as to incline, as indicated by the line I—I (Fig. 1) relative the optical axis A—A. These last mentioned blades 4 converge toward the shell 2 so that the light rays R reflected from below the point 5 on the shell 2 by the law of incidence and reflection have a certain inclination when leaving the tube 3. This causes illumination of an area C—C (Fig. 4) on the horizontal level indicated by the line D—D, and thus illumination of the more immediate area about the vehicle V on which my improved headlight is mounted.

The effect produced by the tube 3 and its blades 4 is that the light rays R leaving the tube 3 have been cut into sections. The rays R having been given a certain direction and inclination to the horizontal level D—D on which the vehicle V is travelling, the area of incidence of these light rays R, indicated by the line C—C becomes illuminated.

If an observer O is located at a point E (for instance the driver of a vehicle travelling in the opposite direction), it will be understood that the light rays R reflected from the shell 2 through the tube 3 do not directly reach the retina of the eye of the observer O. This effect is due to the fact that the tube 3 and its blades hide the observer O from a direct view of the shell 2, viz. the luminous source.

Each blade 4 has a non-reflecting coating 4-a on its upper surface, and a reflecting lower surface 4-b. It is essential that the upper surface of the blade 4 be completely non-reflecting so that the observer O, at the point E, when looking at the blades 4 from his position cannot be dazzled because no reflection of the light rays R, from the observed upper surfaces, occurs. The blades 4 must reflect from their lower surfaces 4–b so that the rays R from the shell 2 which are not parallel with the blade 4 on line I—I are reflected to the outside and can be utilized, so that the loss of luminous intensity is kept to a minimum.

According to the requirements of each case, the blades 4, the tube 3 and the shell 2 may be formed in any suitable way. The same is true of the intensity of the lamp 1 providing the luminous source, the whole reflector shell 2 being called the "luminous source." The length of the area C—C (Fig. 4) is variable and depends upon the size of the tube 3, its shape, height and inclination with reference to the horizontal level D—D, on the number and distance between the blades 4, the size of the shell 2, and on the height of the observer O above the horizontal level D—D.

In order to protect the tube 3 and the blades 4 from dust, air, etc. glass or other transparent material may be put in front of the tube 3. It is possible to seal the tube 3 separately from the shell 2 or both can be sealed as a single unit.

Having described my invention, what I claim is:

1. In a headlight for a vehicle, the combination of a reflector shell which is parabolic in vertical cross-section and semi-circular in horizontal cross-section; a lamp mounted in said shell on the optical axis of said shell, between the rear end of said shell and the focal point of said shell; and a tube so disposed in front of said shell that its longitudinal axis is aligned with said optical axis.

2. A headlight, according to claim 1, in which a plurality of blades is disposed longitudinally in said tube, said blades having non-reflecting upper surfaces and reflecting lower surfaces.

3. A headlight, according to claim 1, in which a plurality of blades is disposed in said tube parallel with said axis.

4. A headlight, according to claim 1, in which a plurality of blades is so disposed in said tube as to converge toward said shell.

References Cited in the file of this patent
UNITED STATES PATENTS

| | | |
|---|---|---|
| 2,182,987 | Hopkins | Dec. 12, 1939 |
| 2,584,697 | Gunther | Feb. 5, 1952 |